United States Patent
Yoshino

(10) Patent No.: US 11,397,874 B2
(45) Date of Patent: Jul. 26, 2022

(54) IMAGE CAPTURING APPARATUS, GENERATING APPARATUS, CONTROL METHOD, AND STORAGE MEDIUM

(71) Applicant: CANON KABUSHIKI KAISHA, Tokyo (JP)

(72) Inventor: Eiji Yoshino, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/118,923

(22) Filed: Dec. 11, 2020

(65) Prior Publication Data

US 2021/0182610 A1    Jun. 17, 2021

(30) Foreign Application Priority Data

Dec. 16, 2019 (JP) .............................. JP2019-226802

(51) Int. Cl.
G06K 9/62 (2022.01)
H04N 5/235 (2006.01)
H04N 5/225 (2006.01)
H04N 5/232 (2006.01)

(52) U.S. Cl.
CPC ......... *G06K 9/6256* (2013.01); *H04N 5/2256* (2013.01); *H04N 5/2351* (2013.01); *H04N 5/2354* (2013.01); *H04N 5/23216* (2013.01)

(58) Field of Classification Search
CPC ............. H04N 5/2256; H04N 5/23216; H04N 5/2351; H04N 5/2354; G06K 9/6256
See application file for complete search history.

(56) References Cited

U.S. PATENT DOCUMENTS

| 10,270,962 | B1* | 4/2019 | Stout ................. H04N 5/23216 |
| 2018/0220061 | A1* | 8/2018 | Wang ................. H04N 5/2356 |
| 2021/0195128 | A1* | 6/2021 | Hanada ................. G06N 3/084 |

FOREIGN PATENT DOCUMENTS

JP        2018-077718 A      5/2018

\* cited by examiner

*Primary Examiner* — Daniel M Pasiewicz
(74) *Attorney, Agent, or Firm* — Cowan, Liebowitz & Latman, P.C.

(57) ABSTRACT

There is provided an image capturing apparatus. A live view shooting unit iteratively captures live view images in accordance with a shooting parameter for live view shooting. A main shooting unit performs main shooting in accordance with a shooting parameter for main shooting. A training unit performs, after the main shooting has been performed, training of a training model that outputs a shooting parameter in accordance with an input image, based on the shooting parameter for the main shooting and a first live view image captured by the live view shooting unit.

4 Claims, 7 Drawing Sheets

| OUTPUT NODE | OUTPUT DATA |
|---|---|
| 1 | SHUTTER SPEED |
| 2 | APERTURE |
| 3 | ISO SENSITIVITY |
| 4 | EXPOSURE CORRECTION |
| 5 | AF MODE |
| 6 | WHITE BALANCE |
| 7 | PHOTOMETRY METHOD |
| 8 | SHARPNESS |
| 9 | CONTRAST |
| 10 | RECORDING IMAGE QUALITY |
| 11 | RECORDING SIZE |
| 12 | STROBE LIGHT EMITTING MODE |
| 13 | LIGHT CONTROL CORRECTION |
| 14 | SYNCHRONOUS SETTING |
| 15 | CAMERA SHAKE CORRECTION |
| 16 | NOISE REDUCTION SETTING |
| ... | ———— |
| N | ———— |

IMAGE CAPTURING APPARATUS, GENERATING APPARATUS, CONTROL METHOD, AND STORAGE MEDIUM

BACKGROUND OF THE INVENTION

Field of the Invention

The present invention relates to an image capturing apparatus, a generating apparatus, a control method, and a storage medium.

Description of the Related Art

In recent years, image capturing apparatuses having AI installed therein are utilized in various fields. In addition, with regard to an image capturing apparatus having AI installed therein, it is proposed to generate supervisory data in the image capturing apparatus and perform training of a training model in the course of a user's usage of the image capturing apparatus. Such an image capturing apparatus allows for obtaining an output of a trained model adapted to the user by iteratively performing training of the training model.

For example, an image capturing apparatus disclosed in Japanese Patent Laid-Open No. 2018-77718 can use a captured image as an input to learn evaluation indices related to aesthetics of the image according to a particular user to facilitate aesthetics determination taking into account the user's determination criteria.

As another use of AI installed in the image capturing apparatus, a function of automatically setting shooting parameters intended by a user in accordance with shooting scenes, for example, is also conceivable. With an image capturing apparatus having such a function, it is conceivable that a captured image captured by a user by pressing the shutter button and shooting parameters corresponding thereto are used to generate supervisory data, and training of the training model is performed. However, a pre-shooting live view image is used as an input when using the trained model subjected to training. Here, even when shooting a same subject, the captured image and the live view image turn out to be different images. Therefore, it becomes more likely to fail in obtaining an output as expected (shooting parameters intended by the user) from the trained model, particularly when the difference between the captured image and the live view image is large.

As a specific example, there may be mentioned a case of shooting a waterfall with a long exposure setting. In this case, although the captured image is a long exposure image, the live view image is an exposure image at a frame rate of the live view, and thus a difference between the captured image and the live view image is large. As another example, there may be mentioned a case of shooting the subject with flashing a strobe. In this case, although the captured image turns out to be a brighter image due to the strobe, the live view image is a dark image, and thus a difference between the captured image and the live view image is large.

SUMMARY OF THE INVENTION

The present invention, which has been made in view of aforementioned circumstances, provides a technique that allows for performing training of a training model that outputs a shooting parameter in accordance with an input image to achieve an improved estimation accuracy of a shooting parameter.

An image capturing apparatus comprising: a live view shooting unit configured to iteratively capture live view images in accordance with a shooting parameter for live view shooting; a main shooting unit configured to perform main shooting in accordance with a shooting parameter for main shooting; and a training unit configured to perform, after the main shooting has been performed, training of a training model that outputs a shooting parameter in accordance with an input image, based on the shooting parameter for the main shooting and a first live view image captured by the live view shooting unit.

A control method executed by an image capturing apparatus, comprising: iteratively capturing live view images in accordance with a shooting parameter for live view shooting; performing main shooting in accordance with a shooting parameter for main shooting; and after the main shooting has been performed, performing training of a training model that outputs a shooting parameter in accordance with an input image, based on the shooting parameter for the main shooting and a first live view image captured during the iterative capturing.

A non-transitory computer-readable storage medium which stores a program for causing a computer to execute a control method comprising: iteratively capturing live view images in accordance with a shooting parameter for live view shooting; performing main shooting in accordance with a shooting parameter for main shooting; and after the main shooting has been performed, performing training of a training model that outputs a shooting parameter in accordance with an input image, based on the shooting parameter for the main shooting and a first live view image captured during the iterative capturing.

An image capturing apparatus comprising: a live view shooting unit configured to iteratively capture live view images in accordance with a shooting parameter for live view shooting; a main shooting unit configured to perform main shooting in accordance with a shooting parameter for main shooting; a determination unit configured to determine a shooting parameter based on live view images iteratively captured by the live view shooting unit, by using a trained model subjected to training with the shooting parameter for the main shooting serving as supervisory data for training and a first live view image serving as input data for training, the first live view image being captured by the live view shooting unit before the main shooting; and a setting unit configured to set the shooting parameter determined by the determination unit as a shooting parameter for the main shooting.

A generating apparatus comprising: a live view acquisition unit configured to acquire live view images sequentially generated by iteratively capturing in accordance with a shooting parameter for live view shooting; a main image acquisition unit configured to acquire a main image by performing main shooting in accordance with a shooting parameter for main shooting; and a generating unit configured to generate a model based on the shooting parameter for main shooting and the live view images acquired by live view acquisition unit before the main shooting.

Further features of the present invention will become apparent from the following description of exemplary embodiments with reference to the attached drawings.

DESCRIPTION OF THE EMBODIMENTS

Figure 1:
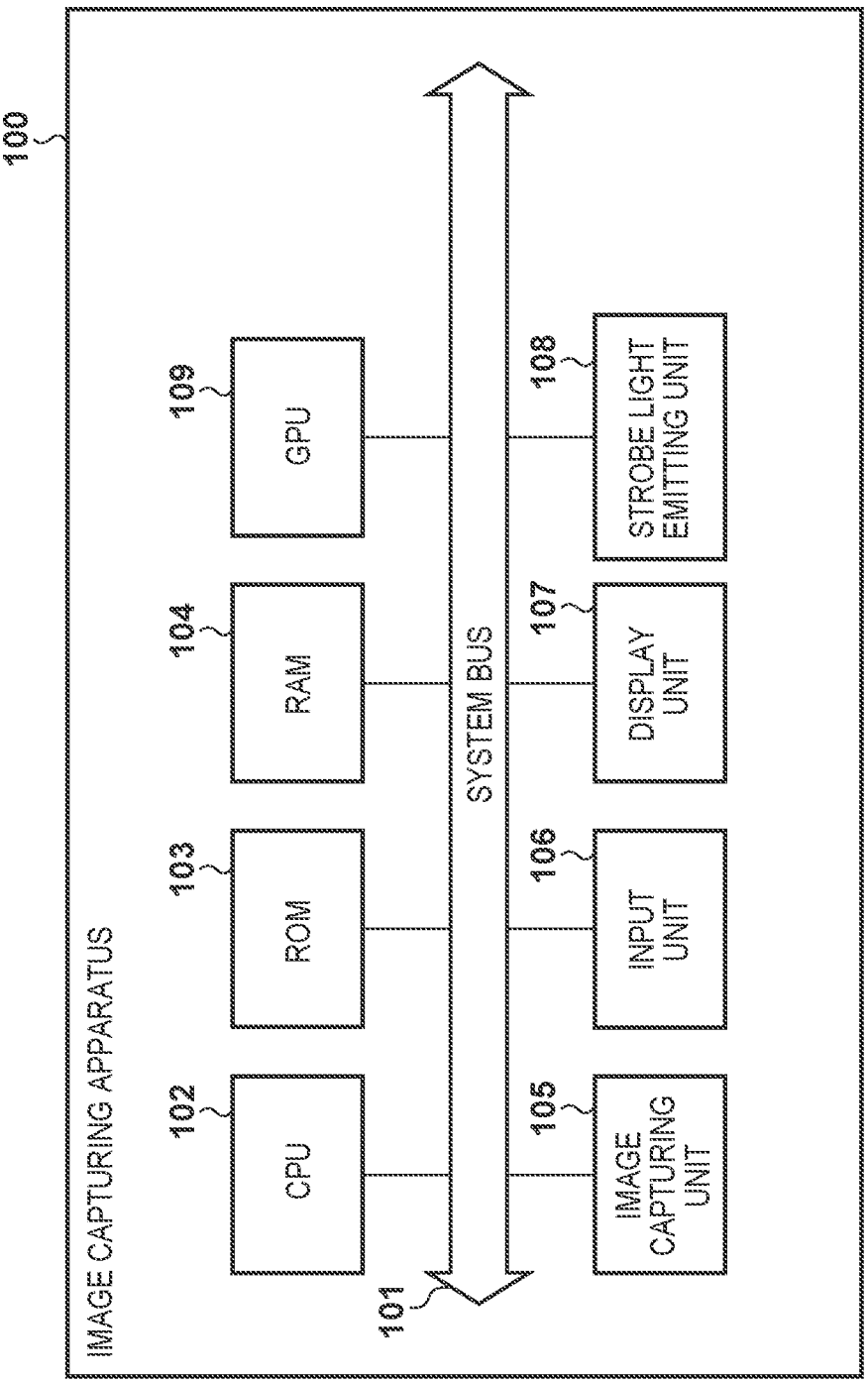
FIG. 1 is a block diagram illustrating hardware resources that constitute an image capturing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating hardware resources that constitute an image capturing apparatus 100. In FIG. 1, a system bus 101 is a general-purpose bus for sending various data such as image data and shooting parameters, control signals, and instruction signals and the like to respective units of the image capturing apparatus 100.

A CPU 102 executes computer programs to perform various processes, controls respective units of the image capturing apparatus 100, or controls data transfer between each unit of the image capturing apparatus 100. The CPU 102 controls respective units of the image capturing apparatus 100 in response to an input signal from the input unit 106 that accepts user operation.

A ROM 103 is an electrically erasable and recordable non-volatile memory, for which a Flash ROM and the like is used, for example. The ROM 103 has stored therein various control programs for controlling the image capturing apparatus 100.

A RAM 104 is a memory that stores constants, variables, programs and the like for operating the CPU 102. The RAM 104 stores image data obtained by image capturing performed by the image capturing unit 105.

An image capturing unit 105 includes an image capturing optical system, an image capturing element (e.g., CMOS sensor), and a peripheral circuit thereof, and converts a subject image formed by the image capturing optical system into electric charge and accumulates the electric charge. Subsequently, the image capturing unit 105 converts analog image signals, which is electrical signals read-out and generated from the accumulated electric charge, into digital image signals, performs various image processing thereon, and outputs image data.

The CPU 102 controls the image capturing unit 105 so as to perform the following two types of image capturing. As a first control, the CPU 102 causes the image capturing unit 105 to perform still image capturing for generating a still image for recording in response to an image capturing instruction from a user. As a second control, the CPU 102 causes the image capturing unit 105 to perform live view image capturing (LV image capturing) to generate a moving image for display used by the user to perform framing prior to still image capturing.

An input unit 106 is constituted by switches and the like, such as a power button and a shutter button, for inputting operations related to image capturing. In addition, the input unit 106 includes a setting dial for setting shooting parameters such as shutter speed, aperture value, ISO sensitivity, a strobe setting button, a touch panel, and the like.

A display unit 107 displays a live view image (LV image) generated by the image capturing unit 105, or displays an operation image (menu image) by which the user operates the image capturing apparatus 100. In addition, the display unit 107 displays a preview of a still image recorded in response to an image capturing instruction from the user. The display unit 107 is constituted by a display device such as a liquid crystal display, an organic EL display, or an electronic paper.

A strobe light emitting unit 108, upon receiving from the CPU 102 an instruction such as light emission timing, amount of light (guide number), emits illumination light in accordance with the instructed light emission timing and the amount of light. Performing image capturing by the image capturing unit 105 synchronously with the strobe light emission performed by the strobe light emitting unit 108 allows for shooting the subject with an appropriate exposure even in a dark environment.

A GPU 109 is an integrated circuit that performs calculation using a plurality of cores. The GPU 109 can perform efficient calculation by performing parallel processing of a larger amount of data, and therefore it is advantageous to perform processing by the GPU 109 when performing training for a plurality of times using a training model such as deep learning. Therefore, it is assumed, in the present embodiment, to use the GPU 109 in addition to the CPU 102 for the processing by the training unit 205 described below. Specifically, when executing a training program including the training model, the training is performed by cooperation of the CPU 102 and the GPU 109.

Note that the processing of the training unit 205 may be performed only by either the CPU 102 or the GPU 109. In addition, processing by an estimation unit 207 described below may also use the GPU 109 as with the training unit 205. In addition, the GPU 109 may also have anon-volatile memory that holds various parameters related to the training model.

Figure 2:
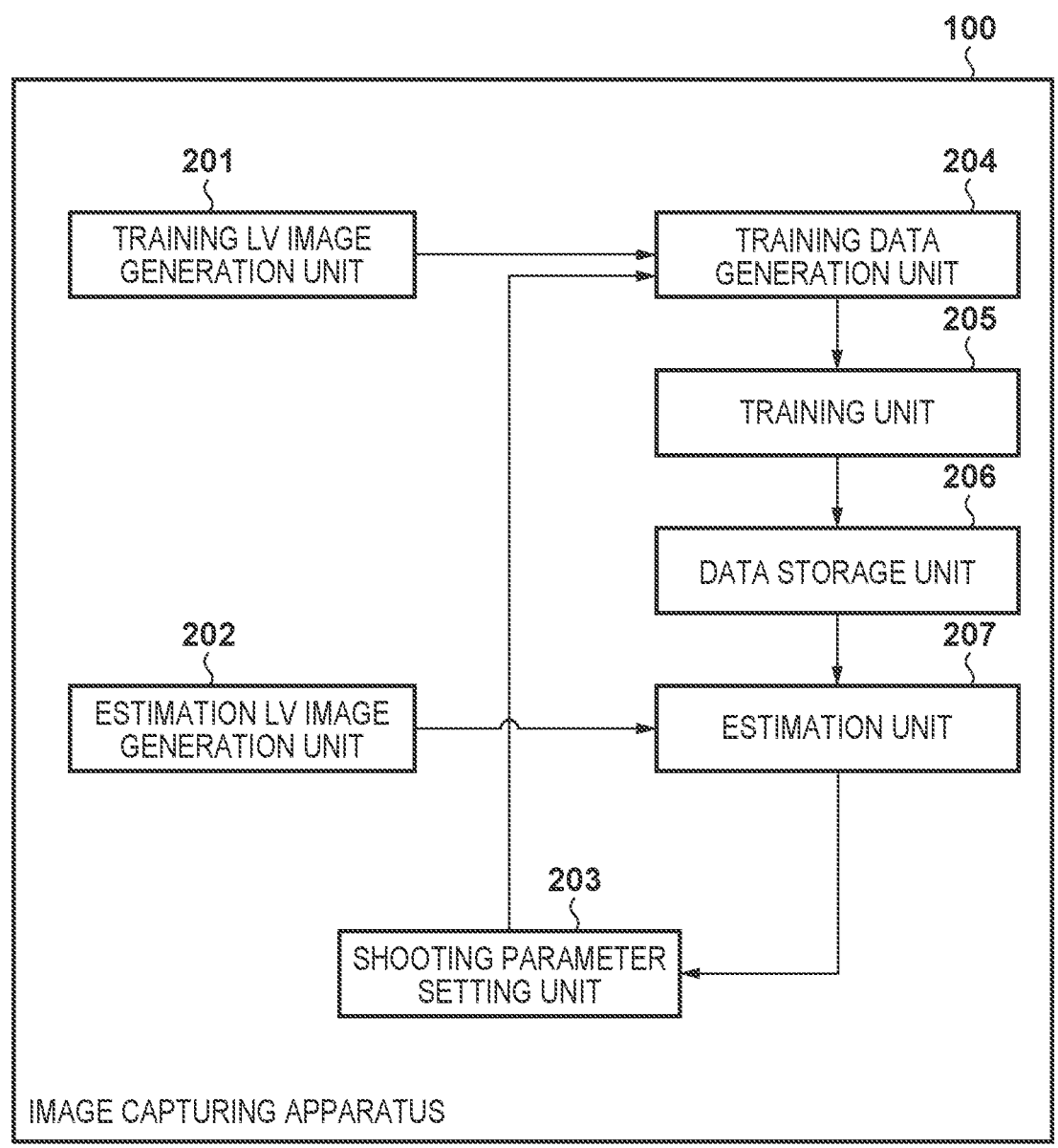
FIG. 2 is a block diagram illustrating a software configuration realized by using the hardware resources of FIG. 1 and programs.

FIG. 2 is a block diagram illustrating a software configuration realized by using the hardware resources of FIG. 1 and programs. The functions of respective units in FIG. 2 are realized by the CPU 102 executing various control programs stored in the ROM 103.

In FIG. 2, a training LV image generation unit 201 stores, in the RAM 104, an LV images generated by the image capturing unit 105 as a training LV image.

An estimation LV image generation unit 202 stores, in the RAM 104, an LV image generated by the image capturing unit 105 as an estimation LV image.

A shooting parameter setting unit 203 stores, in the RAM 104, shooting parameters estimated by the estimation unit 207, making them available as control data of the image capturing unit 105. The shooting parameters include, for example, shutter speed, aperture value, ISO sensitivity, and the like. In addition, the shooting parameter setting unit 203 displays a defined shooting parameter on the display unit 107 so that the user can check or change it. When changing a shooting parameter, the shooting parameter setting unit 203 receives a user input via the input unit 106, and changes the value held in the RAM 104.

A training data generation unit 204 generates training data and stores in the RAM 104. The training data is generated such that the training LV image obtained by the training LV image generation unit 201 is defined as "input data", and the shooting parameter obtained by the shooting parameter setting unit 203 is defined as "correct answer data".

The training unit 205 trains the training model with the CPU 102 and the GPU 109. Specifically, the training unit 205 uses the training data generated by the training data generation unit 204 to perform training of a training model that uses the LV image as "input data" and outputs shooting parameters as "estimation data".

The training unit 205 may include an error detection unit and an updating unit. The error detection unit obtains an error between the output data and the correct answer data, the output data is output from an output layer of a neural network in accordance with the input data input to an input layer. The error detection unit may be configured to calculate the error between the output data from the neural network and the correct answer data, with using a loss function. Based on the error obtained by the error detection unit, the updating unit updates the coupling weighting coefficient and the like between nodes of the neural network so that the error decreases. The updating unit updates the coupling weighting coefficient and the like, with using the back propagation method, for example. The back propagation method is a technique that adjusts the coupling weighting coefficients and the like between nodes of respective neural networks so that the aforementioned error decreases.

A data storage unit 206 stores various parameters of the training model, which is trained by the training unit 205, in the ROM 103, a nonvolatile memory in the GPU 109, and the like. The various parameters of the training model are, for example, the coupling weighting coefficients and the like between respective nodes of the neural network.

The estimation unit 207 sets the various parameters obtained from the data storage unit 206 to the training model, and estimates shooting parameters using, as "input data", the estimation LV image obtained by the estimation LV image generation unit 202.

Figure 3:
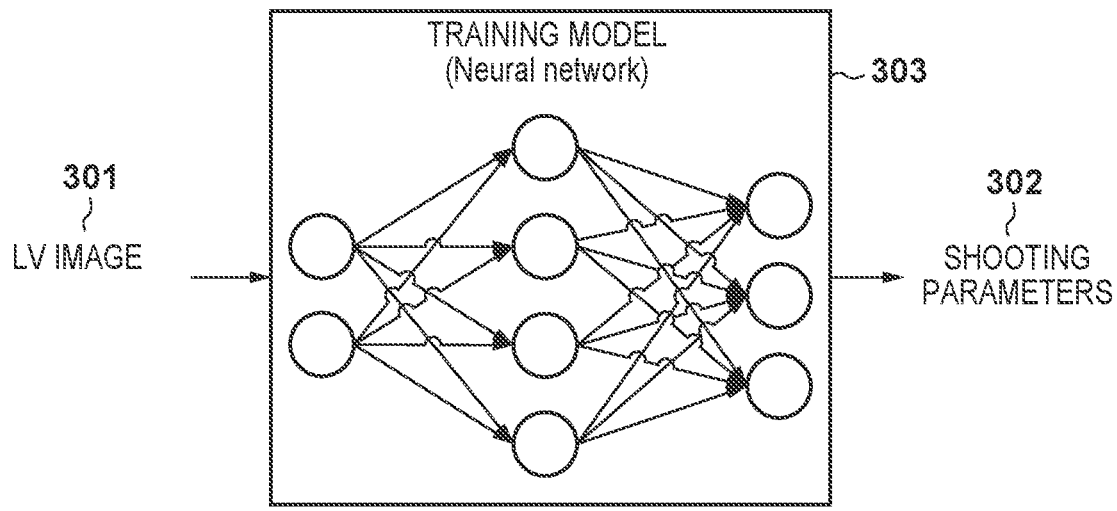
FIG. 3 is a conceptual diagram illustrating an input/output structure that uses a training model.

FIG. 3 is a conceptual diagram illustrating an input/output structure that uses the training model of the present embodiment. The training unit 205 and the estimation unit 207 in FIG. 2 use the training model illustrated in FIG. 3.

The training model 303 is a training model that outputs shooting parameters in accordance with the input image. In the example of FIG. 3, the input data of the training model 303 is an LV image 301. The present embodiment uses, as the LV image 301, an LV image obtained by the training LV image generation unit 201 or the estimation LV image generation unit 202 of FIG. 2.

The output data of the training model 303 are shooting parameters 302. The shooting parameters 302 are various parameters used as data for controlling image capturing by the image capturing apparatus 100. The shooting parameters 302 may include, for example, 16 types of parameters (shutter speed, aperture value, ISO sensitivity, etc.) illustrated in FIG. 3 as output data. Note that, of the various parameters described here, only the parameters desired to be estimated by the training model 303 can be used as the shooting parameters 302.

Here, the training model 303, which is a neural network, can use a convolutional neural network that is widely used particularly for image recognition, and the like. In addition, the training algorithm can apply deep learning that generates by itself the feature amount and coupling weighting coefficients for training.

Figure 4:
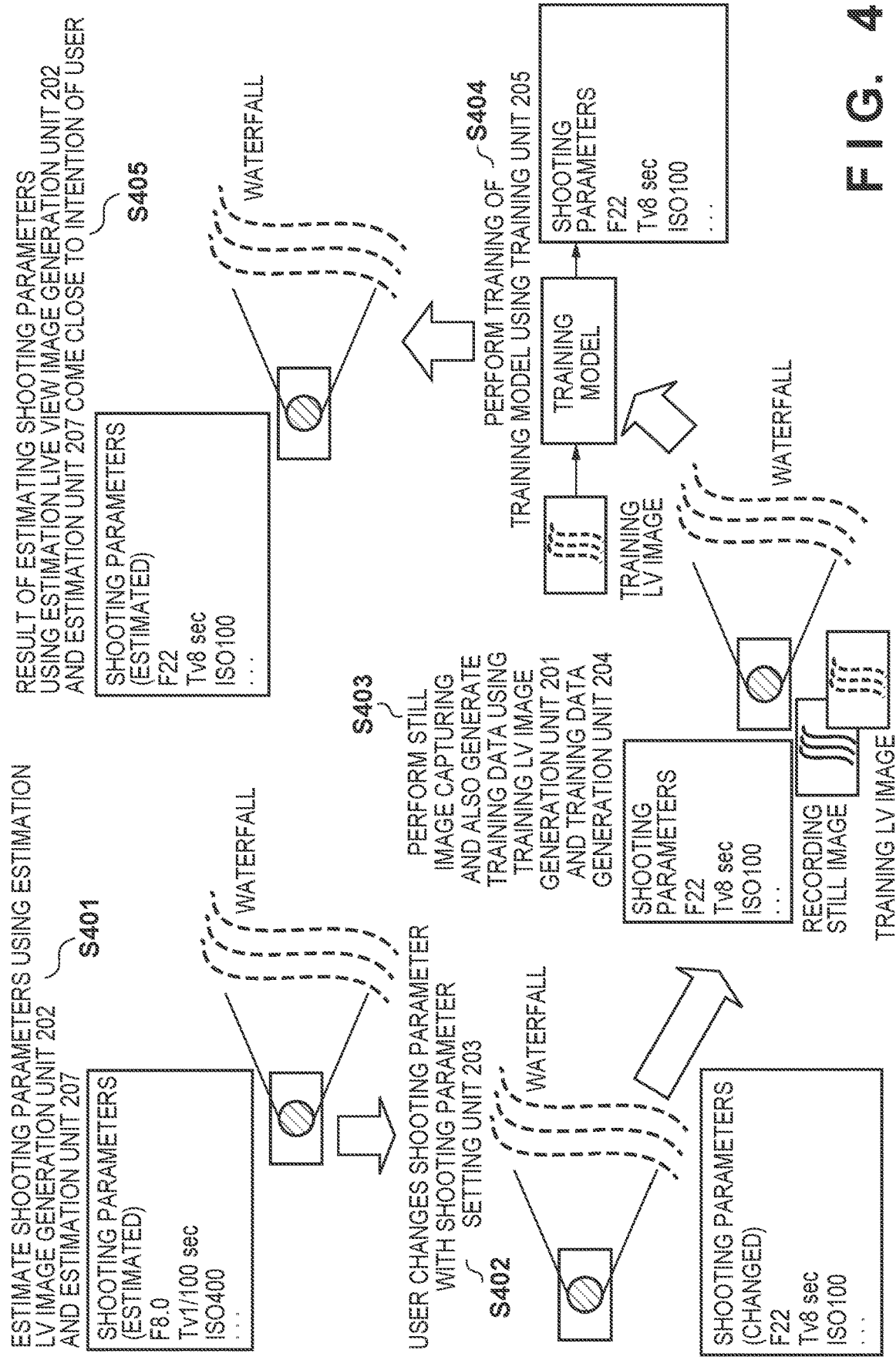
FIG. 4 is an explanatory diagram of an operation of the image capturing apparatus 100 when using the structure of the training model illustrated in FIG. 3.

FIG. 4 is an explanatory diagram of an operation of the image capturing apparatus 100 when using the structure of the training model illustrated in FIG. 3. FIG. 4 illustrates an example of shooting a waterfall as a subject.

At step S401, the image capturing apparatus 100 captures an LV image of a waterfall as a subject, and estimates shooting parameters using the estimation LV image generation unit 202 and the estimation unit 207.

Step S402 indicates a case where a shooting parameter estimated at step S401 does not meet the user's intention. At step S402, the user changes a shooting parameter with the shooting parameter setting unit 203. Here, it is assumed that the user has changed the shutter speed to long exposure setting. According to the change, the F value becomes larger, and the ISO sensitivity becomes smaller.

At step S403, the image capturing apparatus 100 performs still image capturing in response to the pressing of the shutter button by the user, and also generates training data using the training LV image generation unit 201 and the training data generation unit 204. Here, the training LV image generation unit 201 obtains, as a training LV image, an LV image (exposure image at the live view frame rate), instead of a recording still image (long exposure image) intended by the user.

At step S404, the image capturing apparatus 100 performs training of the training model using the training unit 205. Here, the training unit 205 performs training so that shooting parameters set by the user at step S402 will be output for the input of the LV image of the waterfall.

Step S405 illustrates an operation of the training model after having been trained. The image capturing apparatus 100 captures an LV image of a waterfall as a subject in a similar manner to step S401, and estimates shooting parameters using the estimation LV image generation unit 202 and the estimation unit 207. However, since a training model (trained model) trained at step S404 is used here, a shooting parameter (long exposure setting) meeting the user's intention is obtained as a result of estimation, unlike step S401.

The image capturing apparatus 100 of the present embodiment estimates, from the LV image, shooting parameters intended by the user. Here, correlation between LV images and shooting parameters will be described. The user performs setting of shooting parameters in accordance with various shooting scenes, and performs shooting. For example, the user may set the shutter speed to a long exposure setting in the aforementioned waterfall scene, change the aperture setting to control the depth of field in a scene shooting a person, or turn ON the strobe light emission setting in a dark scene. As has been described above, there is a relatively strong correlation between shooting scenes and shooting parameters, and thus it is possible to use an LV image for identifying shooting scenes. Therefore, it can be said that training of a training model that estimates, from the LV image, shooting parameters intended by the user is possible.

Figure 5:
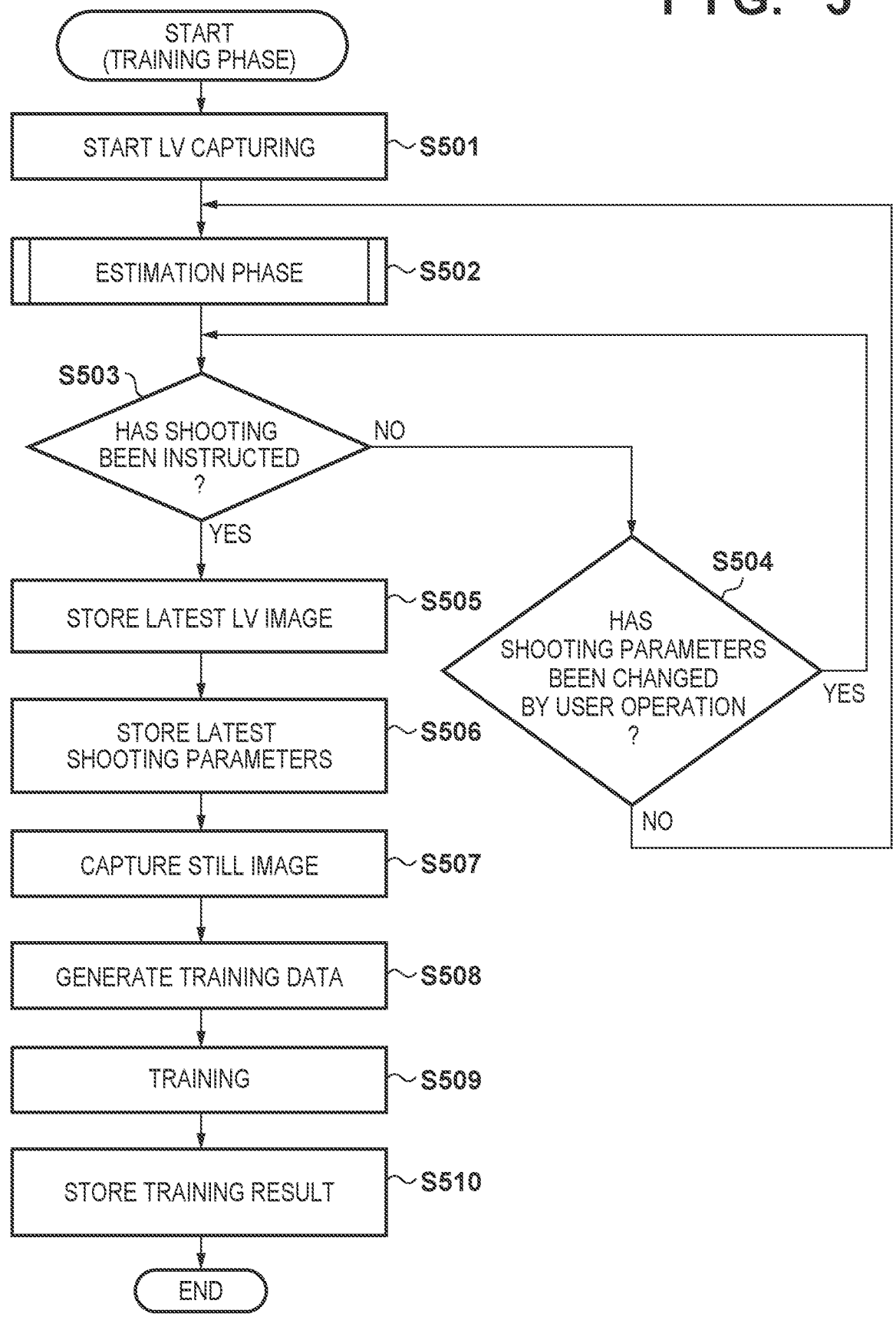
FIG. 5 is a flowchart illustrating a detailed flow of training in a training phase according to a first embodiment.

FIG. 5 is a flowchart illustrating a detailed flow of training in a training phase according to a first embodiment. Upon activation of the image capturing apparatus 100 by operating the power button of the input unit 106, the process of the flowchart starts.

At step S501, the CPU 102 starts a control (LV image capturing) of iteratively capturing LV images, with using the image capturing unit 105. The LV images sequentially generated by LV image capturing are sequentially displayed by the display unit 107. LV image capturing is performed according to shooting parameters (shooting parameters for live view shooting) which are different from the shooting parameters for still image capturing (shooting parameters for main shooting).

At step S502, the CPU 102 performs a process of an estimation phase, and sets shooting parameters in accordance with the shooting scene as the shooting parameters for still image capturing by the image capturing unit 105. Details of the process of step S502 will be described below.

At step S503, the CPU 102 determines whether or not shooting has been instructed by operating the shutter button of the input unit 106. When the CPU 102 determines that shooting has not been instructed, the process flow proceeds to step S504, or the process flow proceeds to step S505 when the CPU 102 determines that shooting has been instructed (main shooting has been instructed by the user).

At step S504, the CPU 102 determines whether or not a setting of the shooting parameters for still image capturing has been changed by operation of the setting dial of the input unit 106. When the CPU 102 determines that a setting has been changed, the process flow returns to step S503, or the process flow returns to step S502 when the CPU 102 determines that no setting has been changed. Note that change of a setting of the shooting parameters is performed by the shooting parameter setting unit 203. In other words, the shooting parameter setting unit 203 changes the shooting parameters for main shooting set at step S502 in response to a change instruction from the user using the input unit 106.

The subject and the angle of view keep changing in the pre-shooting state, and thus the CPU 102 repeats the process of estimating the shooting parameters for still image capturing using the latest LV image and updating the settings. When, however, the user intentionally changes a shooting parameter, estimation of shooting parameters will not be performed thereafter, and the CPU 102 controls to hold the shooting parameter intended by the user as a set value, instead of the result of estimation.

At step S505, the CPU 102 stores, in the RAM 104 as the training LV image (first live view image), the latest LV image obtained at the timing of shooting instruction, with using the training LV image generation unit 201.

At step S506, the CPU 102 stores, in the RAM 104, the latest shooting parameters corresponding to the timing of shooting instruction, with using the shooting parameter setting unit 203.

At step S507, the CPU 102 performs still image capturing (main shooting) according to the latest shooting parameters for main shooting, and generates a still image for recording, with using the image capturing unit 105. Still image capturing is performed according to the latest shooting parameters stored at step S506.

At step S508, the CPU 102 generates training data (supervisory data) including the training LV image (live view image captured immediately before main shooting) and shooting parameters stored at step S505 and step S506, with using the training data generation unit 204.

At step S509, the CPU 102 performs training of the training model with using the training unit 205. The training here is performed based on the training data generated at step S508.

At step S510, the CPU 102 stores the result of training performed at step S509, with using the data storage unit 206.

Figure 6:
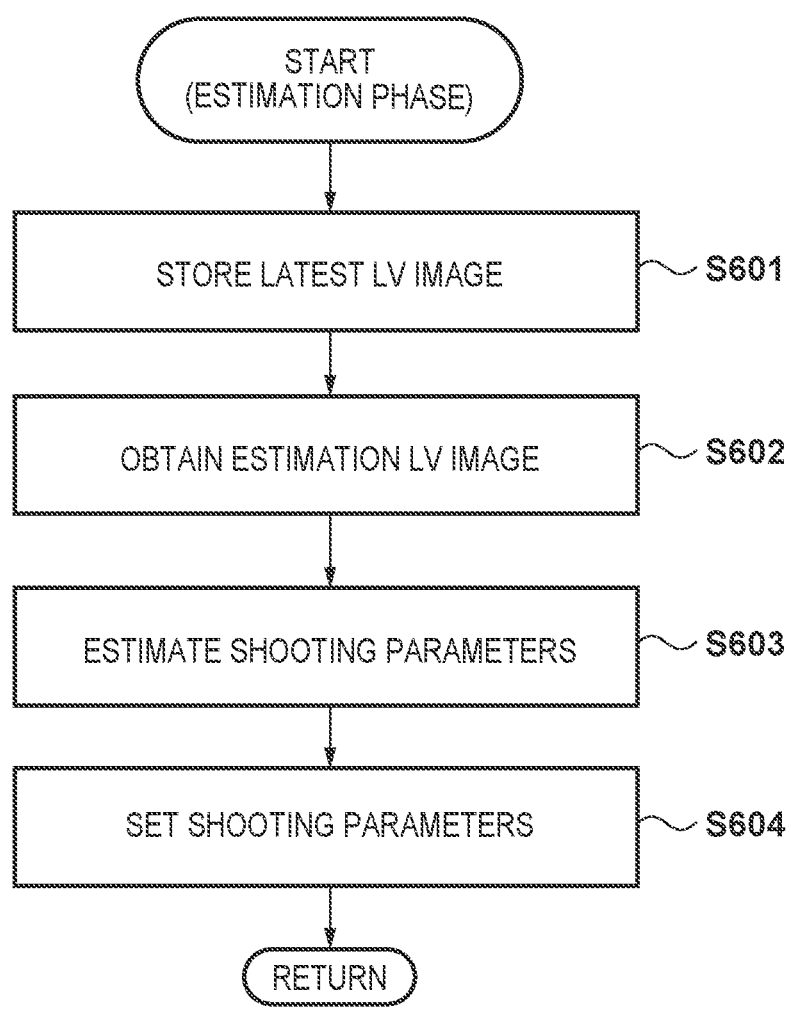
FIG. 6 is a flowchart illustrating a detailed flow of estimation in an estimation phase (step S502 of FIG. 5)

FIG. 6 is a flowchart illustrating a detailed flow of estimation in an estimation phase (step S502 of FIG. 5).

At step S601, the CPU 102 stores, in the RAM 104, the latest LV image at the estimation timing.

At step S602, the CPU 102 obtains, as an estimation LV image (second live view image), the LV image stored at step S601, with using the estimation LV image generation unit 202.

At step S603, the CPU 102 estimates shooting parameters based on the training model, with using the estimation unit 207.

At step S604, the CPU 102 sets the shooting parameters estimated at step S603 as shooting parameters for still image capturing, with using the shooting parameter setting unit 203.

As has been described above, according to the first embodiment, the image capturing apparatus 100 performs training of the training model based on shooting parameters for main shooting and LV images captured by the LV image capturing. Therefore, it becomes possible to improve the estimation accuracy (the possibility of obtaining an estimation result close to the user's intention) in a training model for estimating shooting parameters using an image as input. For example, there is a higher possibility of obtaining an output as expected in an estimation using an LV image as an input, even in a case where the difference between a captured image and an LV image is large, such as when a waterfall has been captured by a long exposure shooting.

Note that, in the flowchart of FIG. 5, the training processes of steps S505 and S506, and S508 to S510 are always performed in a case where shooting is instructed at step S503. However, there may be employed a configuration that performs the training process only when it is determined that the setting of a shooting parameter has been changed by user operation at step S504. This is because, when the user performs still image capturing without changing any shooting parameter, the user's intention is not necessarily reflected in the shooting parameters used in the still image capturing. Therefore, employing a configuration, in which the training process is performed only when the user performs shooting after having changed a shooting parameter, allows for increasing the possibility that the training result meets the user's intention.

In addition, there may be employed, instead of the configuration in which the training process is performed immediately at the timing when still image capturing is performed, a configuration in which the training data is held for a certain time period in the RAM 104 and the training process is performed at another timing (in response to satisfying a predetermined condition). In a case where the user has erased the obtained recording still image after the still image capturing in the aforementioned situation, the CPU 102 may perform a control to discard the corresponding training data from the RAM 104 without performing the training process. In other words, the CPU 102 may control not to perform training of the training model in a case where a predetermined condition is satisfied after the image that is obtained by main shooting has been erased. Note that the predetermined condition is satisfied in a case where, for example, a predetermined time period has elapsed after main shooting has been performed.

In addition, according to the flowchart of FIG. 5, storing of the LV image is performed at step S505 after shooting has been instructed at step S503. In other words, the LV image to be used as a training LV image (first live view image) is captured in response to the user's main shooting instruction. However, there may be employed a configuration in which the LV image to be used as the training LV image is stored when the shutter button is half-pressed. This is because, performing the storing of the LV image after shooting has been instructed (after the shutter button has been full-pressed) may delay the timing of still image capturing at step S507, increasing the shooting time lag thereby. Completing the storing of the LV image when the shutter button is half-pressed (within a time period from when the shutter button is half-pressed to when full-pressed) allows for reducing the shooting time lag. It often happens that the timing of half-pressing the shutter button turns out to be when the user has defined the subject or the shooting angle of view, and therefore the possibility that the training accuracy decreases is considered to be low even when the LV image obtained at this timing is used as the training LV image.

Second Embodiment

In a second embodiment, there will be described an estimation process of shooting parameters and a training process in a case where the user emits strobe light to perform shooting in a dark environment. In the present embodiment, the basic configuration of the image capturing apparatus 100 is similar to that of the first embodiment (see FIGS. 1 and 2). In the following, the difference from the first embodiment will mainly be described.

In the present embodiment, the input unit 106 of the image capturing apparatus 100 includes an estimation instruction button. The user can cause the image capturing apparatus 100 to estimate and set shooting parameters at any timing before instructing shooting by operating the estimation instruction button.

Figure 7:
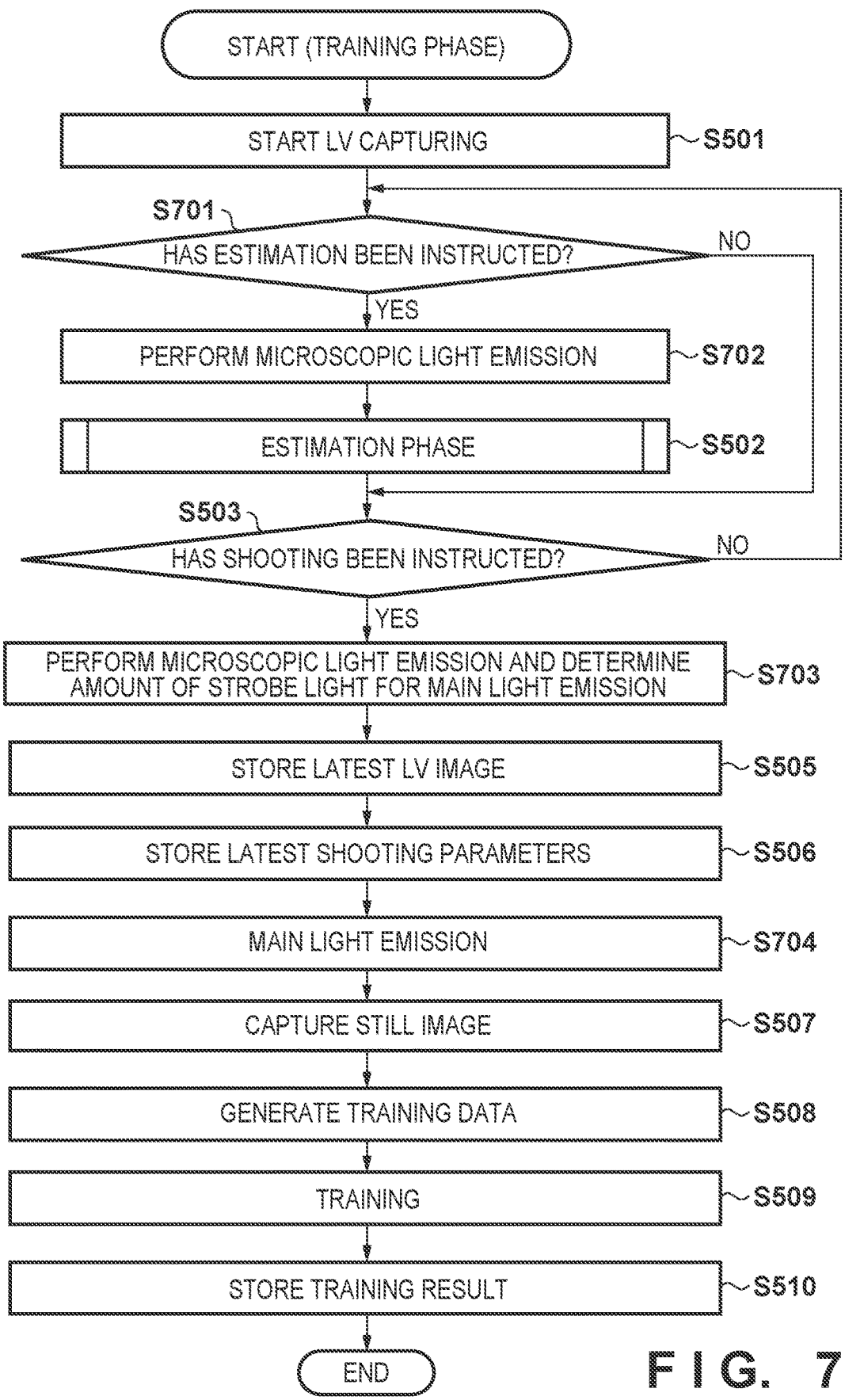
FIG. 7 is a flowchart illustrating a detailed flow of training in the training phase according to a second embodiment.

FIG. 7 is a flowchart illustrating a detailed flow of training in the training phase according to the second embodiment. In FIG. 7, steps that perform identical or similar processes to those in FIG. 5 are provided with identical reference numerals. Upon activation of the image capturing apparatus 100 by operating the power button of the input unit 106, the process of the flowchart starts.

At step S701, the CPU 102 determines whether or not estimation of shooting parameters has been instructed by operation of the estimation instruction button of the input unit 106. When the CPU 102 determines that estimation has been instructed, the process flow proceeds to step S702, or the process flow proceeds to step S503 when the CPU 102 determines that estimation has not been instructed.

At step S702, the CPU 102 performs microscopic light emission of the strobe using the strobe light emitting unit 108. Here, the CPU 102 can perform a process of irradiating the subject with a microscopic amount of light before still image capturing, measuring the luminance of the illuminated subject, and determining the amount of strobe light emission for the still image capturing. Although the CPU 102 irradiates the subject with a microscopic amount of light at step S702, similarly to the case of performing the process of determining the amount of strobe light emission for still image capturing, the purpose of microscopic light emission here is to obtain an LV image appropriate for use in the estimation phase. Performing microscopic light emission at step S702 and subsequently performing the process of the estimation phase of step S502 allows for storing the estimation LV image at step S601, which can be used for identifying the subject (i.e., appropriate for estimation of shooting parameters; even in a dark environment.

At step S703, the CPU 102 performs microscopic light emission of the strobe using the strobe light emitting unit 108, and determines the amount of strobe light for still image capturing. Here, performing the micro emission and subsequently performing the storing process of the LV image of step S505 allows for obtaining a training LV image that can be used for identifying the subject (i.e., appropriate for training the training model) even in a dark environment.

At step S704, the CPU 102, with using the strobe light emitting unit 108, performs main light emission (strobe emission for still image capturing) with the amount of strobe light determined at step S703.

As has been described above, according to the second embodiment, the image capturing apparatus 100 performs microscopic light emission of the strobe when capturing the training LV image (the first live view image) and the estimation LV image (second live view image). Accordingly, it becomes possible to obtain LV images that are appropriate for training and estimation, even in a dark environment.

Note that, although a case of performing still image capturing by causing strobe light to emit in a dark environment has been described in the present embodiment, a configuration, in which estimation of shooting parameters is performed in response to an operation of the estimation instruction button of the input unit 106, can also be applied for a case of not emitting the strobe light. In such a case, the CPU 102 controls to perform the process of the estimation phase at step S502 without performing the process of step S701 (micro light emission), in response to the determination at step S701 that the estimation instruction button of the input unit 106 has been operated. In addition, the microscopic light emission and the main light emission of the strobe are not performed at steps S703 and S704.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-226802, filed Dec. 16, 2019, which is hereby incorporated by reference herein in its entirety.

What is claimed is:

1. A determining apparatus comprising at least one processor and/or at least one circuit which functions as:
    a live view acquisition unit configured to acquire live view images sequentially generated by iteratively capturing in accordance with a shooting parameter for live view shooting;
    a main image acquisition unit configured to acquire a main image by performing main shooting in accordance with a shooting parameter for main shooting;
    a determination unit configured to determine a second shooting parameter for second main shooting based on a second live view image acquired by the live view acquisition unit before the second main shooting through an estimation process caused by inputting the second live view image acquired by the live view acquisition unit before the second main shooting to a trained model; and
    a setting unit configured to set the shooting parameter determined by the determination unit as a shooting parameter for the main shooting,
    wherein the trained model is a model generated through a supervised training process which uses the first shooting parameter for the first main shooting as correct answer data and a first live view image acquired by the live view acquisition unit before the first main shooting is performed as input data.

2. The determining apparatus according to claim 1, wherein the at least one processor and/or the at least one circuit further functions as a generation unit configured to generate the trained model through the supervised training process.

3. A shooting parameter determination system comprising at least one processor and/or at least one circuit which functions as:
    a live view acquisition unit configured to acquire live view images sequentially generated by iteratively capturing in accordance with a shooting parameter for live view shooting before a second main shooting is performed; and
    a determination unit configured to determine a second shooting parameter based on a second live view image acquired by the live view acquisition unit before the second main shooting is performed through an estimation process caused by inputting the second live view image acquired by the live view acquisition unit before the second main shooting to a trained model;
    wherein the trained model is a model generated through a supervised training process which uses the first shooting parameter for the first main shooting as correct answer data and a first live view image acquired by the live view acquisition unit before the first main shooting is performed as input data.

4. A control method executed by a shooting parameter determination system, comprising:
    acquiring live view images sequentially generated by iteratively capturing in accordance with a shooting parameter for live view shooting before a second main shooting is performed; and
    determining a second shooting parameter based on a second live view image acquired before the second main shooting is performed through an estimation process caused by inputting the second live view image acquired by the live view acquisition unit before the second main shooting to a trained model;
    wherein the trained model is a model generated through a supervised training process which uses the first shooting parameter for the first main shooting as correct answer data and a first live view image acquired before the first main shooting is performed as input data.

* * * * *